US011277492B2

(12) United States Patent
Kholmyansky et al.

(10) Patent No.: US 11,277,492 B2
(45) Date of Patent: Mar. 15, 2022

(54) SEAMLESS CONNECTIVITY TO SMART DEVICES, CAMERAS AND HOME CARE DEVICES OVER WIFI NETWORKS AND CLOUD

(71) Applicant: Sure Universal Ltd., Ramat Gan (IL)

(72) Inventors: Max Kholmyansky, Ramat Gan (IL); Vadim Lanzman, Hod Hasharon (IL); Itzik Alkotzer, Holon (IL); Viktor Ariel, Modi'in (IL)

(73) Assignee: Sure Universal Ltd., Ramat Gan (IL)

( * ) Notice: Subject to any disclaimer, the term of this patent is extended or adjusted under 35 U.S.C. 154(b) by 0 days.

(21) Appl. No.: 16/850,227

(22) Filed: Apr. 16, 2020

(65) Prior Publication Data

US 2020/0336564 A1 Oct. 22, 2020

Related U.S. Application Data

(60) Provisional application No. 62/834,978, filed on Apr. 17, 2019.

(51) Int. Cl.
*H04L 29/08* (2006.01)
*H04L 12/66* (2006.01)
(Continued)

(52) U.S. Cl.
CPC ............. *H04L 67/32* (2013.01); *H04L 12/66* (2013.01); *H04L 67/104* (2013.01);
(Continued)

(58) Field of Classification Search
CPC ... H04L 67/32; H04L 67/104; H04L 67/1097; H04L 67/12; H04L 67/141; H04L 67/16; H04L 12/66
See application file for complete search history.

(56) References Cited

U.S. PATENT DOCUMENTS 9,838,390 B2 * 12/2017 Zakaria ............... H04L 63/0884
10,158,536 B2 * 12/2018 Kim .................... H04L 12/2834
(Continued)

OTHER PUBLICATIONS

International Search Report for corresponding PCT application PCT/IB2020/053615 dated Jun. 30, 2020.

*Primary Examiner* — Sm A Rahman
(74) *Attorney, Agent, or Firm* — Heidi Brun Associates Ltd.

(57) ABSTRACT

A mobile universal device operator (MUDO) operates at least one device and includes a seamless interaction manager and an appliance manager. The seamless interaction manager transmits a resource discovery requests to a gateway over a local network and to a cloud server over an external network. The gateway stores a local resource directory listing at least one resource of each device and the cloud server stores an associated cloud resource directory. The manager receives responses from the resource directories, selects a local command path or a cloud command path and associates the selected command path with each discovered resource. The appliance manager transfers instructions received from a user about a selected resource to the seamless interaction manager. The interaction manager translates the instructions into a unified command to the selected discovered resource via its associated command path.

10 Claims, 7 Drawing Sheets

(51) Int. Cl.
  *H04L 67/60*     (2022.01)
  *H04L 67/104*    (2022.01)
  *H04L 67/141*    (2022.01)
  *H04L 67/12*     (2022.01)
  *H04L 67/1097*   (2022.01)
  *H04L 67/51*     (2022.01)
  *G16Y 10/75*     (2020.01)

(52) U.S. Cl.
  CPC .......... *H04L 67/1097* (2013.01); *H04L 67/12* (2013.01); *H04L 67/141* (2013.01); *H04L 67/16* (2013.01); *G16Y 10/75* (2020.01)

(56) References Cited

U.S. PATENT DOCUMENTS

| | | |
|---|---|---|
| 2007/0097993 A1 | 5/2007 | Bojhara |
| 2016/0165650 A1 | 6/2016 | Kim |
| 2016/0195859 A1 | 7/2016 | Britt |
| 2017/0171607 A1* | 6/2017 | Britt ........................ H04W 4/80 |
| 2017/0195377 A1* | 7/2017 | Ahmed .................. H04L 51/04 |
| 2018/0145945 A1 | 5/2018 | Gupta Hyde |
| 2019/0019402 A1 | 1/2019 | Nachshon |
| 2019/0044826 A1 | 2/2019 | Flores Guerra |
| 2020/0085300 A1* | 3/2020 | Kwatra .................. G16H 40/67 |
| 2020/0177590 A1* | 6/2020 | Levy ..................... H04L 63/104 |

* cited by examiner

SEAMLESS CONNECTIVITY TO SMART DEVICES, CAMERAS AND HOME CARE DEVICES OVER WIFI NETWORKS AND CLOUD

CROSS REFERENCE TO RELATED APPLICATIONS

This application claims priority from U.S. provisional patent application 62/834,978, filed Apr. 17, 2019, which is incorporated herein by reference.

FIELD OF THE INVENTION

The present invention relates to IoT and home care devices generally and to their operation from both inside and outside the premises, in particular.

BACKGROUND OF THE INVENTION

Internet of Things (IoT) devices have become increasingly popular as more consumers implement Smart Homes to provide digital operation of the appliances in the home. IoT devices may be sensors or appliances and are typically placed throughout a home or premises.

IoT devices are typically operated remotely, typically with a dedicated remote controller. Some remote controllers, such as the remote controllers of US 2019/0044826 to Flores Guerra and US 2018/0145945 to Gupta Hyde, are more universal and thus, can control all of the devices in the home. The system for controlling IoT devices of US Patent Publication US 2019/0019402 to Nachshon et al., published Jan. 17, 2019, issued as U.S. Pat. No. 10,867,507 on Dec. 15, 2020, commonly owned by the Applicant of the present application and incorporated herein by reference, has a universal remote controller implemented on a mobile device.

Figure 1:
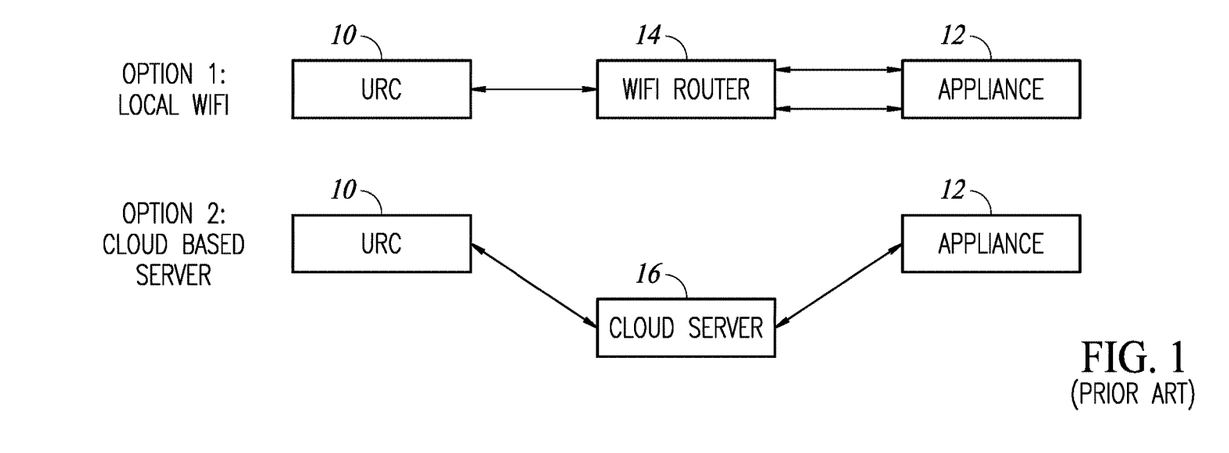
FIG. 1 is a schematic illustration showing two basic mechanisms via which prior art universal remote controllers operate.

In general, there are typically two basic mechanisms via which universal remote controllers operate, as shown in FIG. 1 to which reference is now made. The first mechanism utilizes a WiFi router 14 which enables a local IP network between a universal remote controller (URC), labeled 10, and the device or appliance 12. URC 10 and appliance 12 then communicate via the "local" IP network. This implementation works well within the home or premises in which WiFi router 14 is installed.

The second mechanism utilizes the "cloud" or the Internet. In this mechanism, URC 10 communicates with appliance 12 via a cloud server 16. This implementation can operate both within and without the premises and thus, is useful for commanding the appliances externally. For example, consumers typically install an IoT camera in order to see what is happening within their home while they are outside of the home.

SUMMARY OF THE PRESENT INVENTION

There is therefore provided, in accordance with a preferred embodiment of the present invention, a mobile universal device operator (MUDO) to operate at least one device in a premises. The MUDO includes a seamless interaction manager and an appliance management core. The seamless interaction manager transmits a gateway resource discovery request to the gateway over a local network to which the MUDO is connected and a cloud resource discovery request to the cloud server over an external network. The gateway stores a local resource directory listing at least one resource of each the device and the cloud server stores a cloud resource directory associated with the local resource directory. The interaction manager receives responses from the local and cloud resource directories, respectively, selects a local command path via the gateway or a cloud command path via the cloud server depending on the responses, and associates the selected command path with each the discovered resource. The appliance management core transfers instructions received from a user about a selected discovered resource to the seamless interaction manager. The interaction manager translates the instructions into one of a set of unified commands to the selected discovered resource and sends the one unified command to the selected discovered resource via its associated command path.

Moreover, in accordance with a preferred embodiment of the present invention, the local command path includes a local resource address reached via the local network and the cloud command path includes a cloud resource address reached via the cloud network.

Further, in accordance with a preferred embodiment of the present invention, the MUDO also includes a display, wherein, when the unified command is a state observation request for the at least one device, the appliance management core receives ongoing updates of device state from the gateway via the selected command path for each discovered resource of the device, and the core provides the updates to the display.

Additionally, in accordance with a preferred embodiment of the present invention, the at least one device is an IoT device or a home care device.

Furthermore, in accordance with a preferred embodiment of the present invention, when the device is a home care device it has at least one resource representing a measurement request of a medical or well-being related state of a human being.

Still further, in accordance with a preferred embodiment of the present invention, the MUDO accesses a measurement database storing the history on the cloud server.

Alternatively, in accordance with a preferred embodiment of the present invention, the at least one device is a camera and the MUDO also includes a video establishing client to operate a video establishing resource to establish a video stream communication with the camera.

Moreover, in accordance with a preferred embodiment of the present invention, the manager selects between the local command path and the cloud command path for activating the video establishing client and the video establishing client selects between a point-to-point (P2P) video path along the local network and a tunneling server video path via the external network.

Further, in accordance with a preferred embodiment of the present invention, the video establishing client operates a P2P video path over the local network, the video path being set up via the cloud command path.

There is also provided, in accordance with a preferred embodiment of the present invention, a gateway to enable a MUDO to operate at least one device in a premises. The gateway to communicate with the at least one device via a local network and each device having at least one resource. The gateway includes a local resource directory listing at least one resource of each the device and a resource manager. The resource manager performs the following actions: responds to a resource discovery request from the MUDO via a local network with an associated local command path for a requested resource, responds to commands from the MUDO for the resource using either the local command path or a cloud command path provided by a cloud server in communication with the gateway via an external network, and synchronizes a cloud resource directory on the cloud server to the local resource directory.

Moreover, in accordance with a preferred embodiment of the present invention, the gateway includes a multiplicity of agents, each implementing a specific one of a multiplicity of IoT device protocols, each agent to communicate with those of the IoT devices which operate according to its specific IoT device protocol. The gateway provides instructions received from the MUDO and receives state information from its associated IoT devices.

Further, in accordance with a preferred embodiment of the present invention, one of the device protocols is a medical device protocol.

Still further, in accordance with a preferred embodiment of the present invention, the at least one device is a home care device.

Moreover, in accordance with a preferred embodiment of the present invention, when the device is a home care device, it has at least one resource representing a measurement request of a medical or well-being related state of a human being.

Further, in accordance with a preferred embodiment of the present invention, the gateway provides the measurements to a measurement database stored on the cloud server Alternatively, in accordance with a preferred embodiment of the present invention, the at least one device is a camera and the gateway also includes a video establishing client to operate a video establishing resource to establish a video stream communication between the MUDO and the camera.

Moreover, in accordance with a preferred embodiment of the present invention, the resource manager selects between the local command path and the cloud command path for activating the video establishing client and the video establishing client selects between a P2P video path along the local network a tunneling server video path via the external network.

Furthermore, in accordance with a preferred embodiment of the present invention, the video establishing client operates a P2P video path over the local network, the video path being set up via the cloud command path.

There is also provided, in accordance with a preferred embodiment of the present invention, a method for a MUDO to operate at least one device in a premises. The method includes transmitting a gateway resource discovery request to a gateway over a local network to which the MUDO is connected and a cloud resource discovery request to a cloud server over an external network, the gateway storing a local resource directory listing at least one resource of each the device, the cloud server storing a cloud resource directory associated with the local resource directory. The method also includes receiving responses from the local and cloud resource directories, respectively, to select a local command path via the gateway or a cloud command path via the cloud server depending on the responses, associating the selected command path with each discovered resource, receiving instructions from a user about a selected discovered resource, translating the instructions into one of a set of unified commands to the selected discovered resource, and sending the one unified command to the selected discovered resource via its associated command path.

Moreover, in accordance with a preferred embodiment of the present invention, the local command path includes a local resource address reached via the local network and the cloud command path includes a cloud resource address reached via the cloud network.

Further, in accordance with a preferred embodiment of the present invention, the method also includes when the unified command is a state observation request for the at least one device, receiving ongoing updates of device state from the gateway via the selected command path for each discovered resource of the device, and providing the updates to a display of the MUDO.

Still further, in accordance with a preferred embodiment of the present invention, the at least one device is an IoT device or a home care device.

Moreover, in accordance with a preferred embodiment of the present invention, when the device is a home care device, it has at least one resource representing a measurement request of a medical or well-being related state of a human being.

Further, in accordance with a preferred embodiment of the present invention, the method also includes accessing a measurement database storing a history of the measurements on the cloud server.

Alternatively, in accordance with a preferred embodiment of the present invention, the at least one device is a camera and the method also includes operating a video establishing resource to establish a video stream communication with the camera.

Moreover, in accordance with a preferred embodiment of the present invention, the method also includes selecting between the local command path and the cloud command path for activating the video establishing resource and selecting operating the video establishing resource between a P2P video path along the local network and a tunneling server video path via the external network.

Finally, in accordance with a preferred embodiment of the present invention, the method also includes operating a P2P video path over the local network, the video path being set up via the cloud command path.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that most of the smart home systems require communications in order to work. However, the types of communications are different, depending upon where the user is. Internal communications (i.e. within a building) are typically implemented directly, with either IR (infrared) or WiFi, while external communications (i.e. outside of buildings) are typically implemented with cellular communications connecting to the Internet and from there to a cloud server.

Applicant has realized that consumers need to access their IoT devices both locally (when within range of their local WiFi router) and "over the Internet" (when the consumer is out of their local WiFi range but still wants to access his/her home devices) and that the choice of the "channel" needs to be transparent to the consumer. Moreover, the system should have the same functionality, irrespective of the channel. Applicant has realized that the latter may be more complicated the Internet is vulnerable to network downtime and traffic quality issues and thus, cannot always be relied upon.

Figure 2:
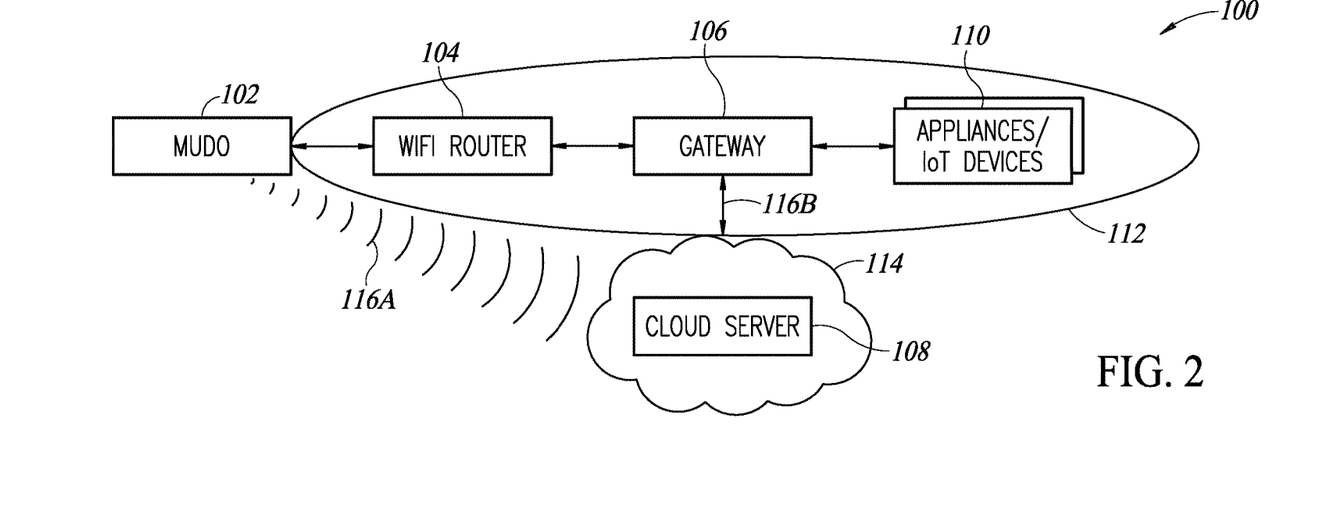
FIG. 2 is a schematic illustration of a seamless control system, constructed and operative in accordance with a preferred embodiment of the present invention.

Reference is now made to FIG. 2, which illustrates a seamless control system 100, constructed and operative in accordance with a preferred embodiment of the present invention. Seamless control system 100 comprises a mobile universal device operator (MUDO) 102, a WiFi router 104, a gateway 106 and a cloud server 108 and operates at least one appliance/IoT device 110 and typically many such devices 110s. Appliance/IoT devices 110 may be any smart home device which may be digitally controlled, such as a sensor or any kind of appliance, such as, but not limited to, a camera, a smart light, a smart lock, a TV, any kind of "white goods" (such as an oven, a dishwasher, a washing machine, a drier, etc.), a set-top box, an alarm system, etc. For clarity, the present specification will utilize the more general term "IoT device". In accordance with a preferred embodiment of the present invention and as discussed in more detail hereinbelow, IoT devices may also be home care devices.

WiFi router 104, gateway 106 and IoT devices 110 may be located within premises 112 and, as is known, WiFi router 104 may provide a wireless Internet connection within premises 112 whose range may extend outside of the premises somewhat.

MUDO 102 may be based on the mobile universal remote controller described in US Patent Publication 2017/0242557, published Aug. 24, 2017, and issued as U.S. Pat. No. 10,719,200 on Jul. 21, 2020, and US Patent Publication 2019/0019402, issued as U.S. Pat. No. 10,867,507, mentioned hereinabove, commonly owned by Applicant and incorporated herein by reference. MUDO 102 may be implemented as an "app" or software application on a mobile device, such as a mobile phone or a tablet, and may comprise a WiFi communication unit and a data network communication unit installed therein. MUDO 102 may provide a single user interface to select the IoT device 110 with which the user desires to communicate, from among a list of IoT devices 110 within premises 112 or which 'belong' to the user of MUDO 102. For example, the user may also want to operate devices in an office or in a premises of a relative or a friend. In addition, while FIG. 2 shows a single MUDO 102, typically, a premises may have multiple MUDOs 102 which may operate the devices 102 of the premises since typically, each member of the entity responsible for the premises (family, community, or office) may have his/her own MUDO 102.

The communication may be of an instruction (e.g. turn on, change the volume/temperature/etc., set a timer, etc.), of a state notification or of data. In addition, MUDO 102 may be capable of "discovery", i.e. the ability to locate devices capable of connectivity, and to configure the system to establish such a connectivity.

In accordance with a preferred embodiment of the present invention, each MUDO 102 may interact with WiFi router 104 when MUDO 102 may be within premises 112 and may interact with cloud server 108 when MUDO 102 may be outside of the range of transmission of WiFi router 104. To this end, cloud server 108 may be a server on the Internet, here labeled 114. MUDO 102 and gateway 106 may each have a connection 116A and 116B, respectively, to Internet 114, where connection 116A, for MUDO 102, may be a wireless connection while connection 116B, for gateway 106, may be a wired or a wireless connection.

In accordance with a preferred embodiment of the present invention, gateway 106 may be connected to the local WiFi network, created by WiFi router 104, and to Internet 114, via connection 116B. In addition, gateway 106 may be connected to the various IoT devices 110 in the premises. Gateway 106 may be implemented in any suitable unit, such as in a computing device, a set-top box or in an independent device, such as a smart plug. Irrespective of the device it is implemented in, gateway 106 may have its own graphical user interface (GUI) for the situations when an associated screen or monitor is connected to it.

As discussed in US Patent Publication 2019/0019402, gateway 106 may be multi-protocol; it may handle multiple types of appliances which may operate with different types of communication methods (IR, WiFi, etc.) and with multiple radio-based IP (Internet Protocol) and non-IP appliance protocols (Bluetooth, ZigBee, BLE, Zwave, OnVif, etc.). In addition, as discussed in more detail hereinbelow, it may handle medical protocols, such as the FHIR protocol. Gateway typically has multiple software plug-in agents, one per protocol, and may be able to add and remove protocols as the IoT devices in premises 112 change.

Gateway 106 may act as a "bridge" between MUDO 102 and IoT devices 110 and, in accordance with a preferred embodiment of the present invention, may provide the same exposure mechanism for both local (e.g. WiFi) and public (e.g. Internet) networks. The exposure mechanism may include a common language of resources, queries and commands. For the public network operation, gateway 106 may utilize cloud server 108, which may transmit instructions and other communications from MUDO 102 and vice versa using the common language.

MUDO 102 may utilize gateway 106 to seamlessly find the available connection. When both exposure mechanisms are an option, MUDO 102 may select the optimal one.

Figure 3:
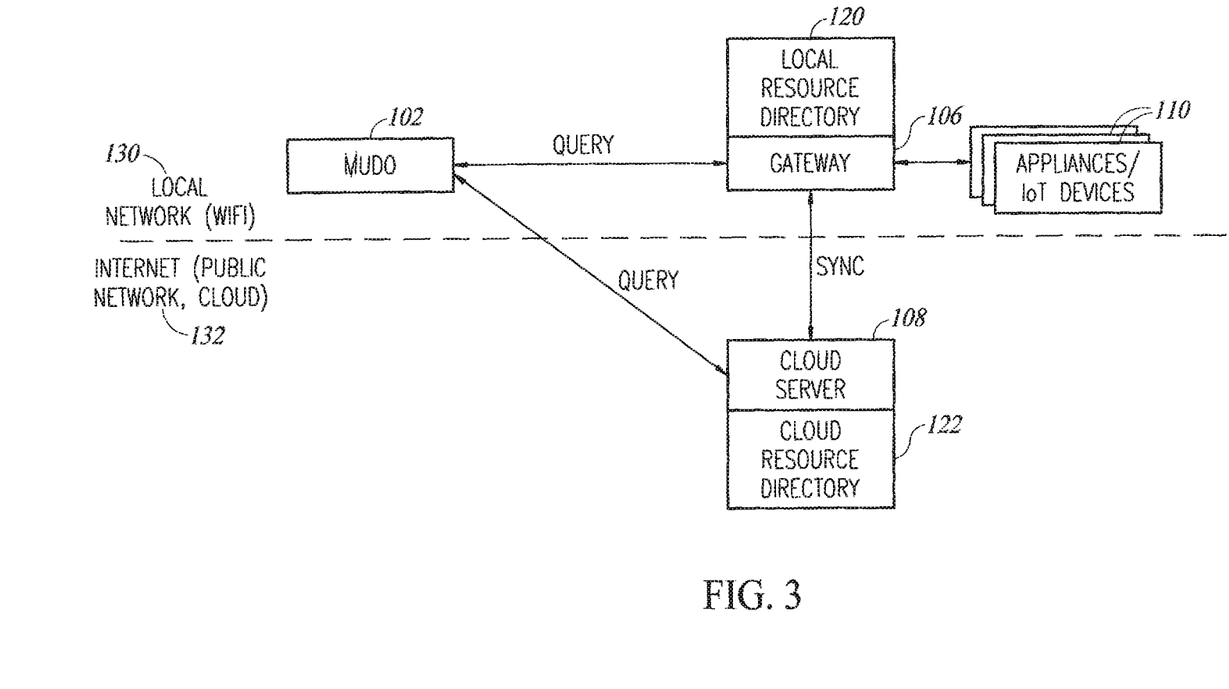
FIG. 3 is a schematic illustration of some elements of the seamless control system of FIG. 2 and its operation during discovery and control of new appliances.

Reference is now made to FIG. 3, which illustrates some elements of seamless system 100 and its operation during discovery and control of new appliances. In addition, FIG. 3 shows that gateway 106 and appliances 110 are connected to a local network 130 via WiFi while cloud server 108 is connected to the Internet 132, otherwise known as a public network or the cloud. While MUDO 102 is shown in FIG. 3 as being currently connected to local network 130, it will be appreciated that it may be moved to become connected to Internet 132.

In accordance with a preferred embodiment of the present invention, gateway 108 may maintain a local resource directory 120 storing information about IoT devices and their respective resources 110, and cloud server 106 may maintain a cloud resource directory 122 storing similar information. Since local resource directory 120 may be the master directory, gateway 108 may regularly update cloud resource directory 122 to contain the same "logical" data as local resource directory 120 (the data may not be 100% identical, as explained hereinbelow). Typically, gateway 105 may update or synchronize cloud resource directory 122 whenever local resource directory 120 may be updated. For example, if a new device becomes available, gateway 108 may add the resources of the new device to local resource directory 120 and then may update cloud resource directory 122 with the new resources, so that the same resources will be exposed to cloud server 108.

Gateway 106 may be responsible to synchronize resource directories 120 and 122 at any moment. If local resource directory 120 may change while gateway 106 may be temporarily disconnected from Internet 132, synchronization may not be possible at that moment. In this case, gateway 106 may monitor the connection, and, once Internet 132 may become re-connected, gateway 106 may perform the synchronization (either by sending the newly added information, or by copying all of local resource directory 120 to cloud resource directory 122).]

In accordance with a preferred embodiment of the present invention, each resource listed in directories 120 and 122 may represent a specific capability of a particular appliance or IoT device 110. For example, in a smart light, ON/OFF may be a first resource, brightness may be a second resource and RGB color may be a third resource of that specific appliance.

Each resource directory 120 and 122 may support resource discovery queries from MUDOs 102, for example, in a manner similar to that defined by the OCF Resource Type Specification. A resource discovery query may be a request to list all the available resources matching the specified filter (for example, by a type of the resource, or by ID of the appliance, or any other). The result of such a query may be a list of the available resources. A resource in a query result may be structured similarly to the URLs being used over the Internet: it may contain the protocol (TCP or UDP), IP address and port of the listener to be accessed, and the uniform resource identifier (URI) (like "/switch") to access a specific resource. A single resource may have multiple endpoints. For example, it may support both UDP and TCP, and both secure and non-secure channels.

It will be appreciated that, once MUDO 102 may receive the result, it may know how to access the requested resource. Resources may respond to GET, UPDATE or NOTIFY commands, to respectively retrieve state or receive and then respond to commands from MUDOs 102.

When looking for an appliance or IoT device 110, MUDO 102 may transmit a query to both resource directories 120 and 122 for a particular resource (such as an on/off switch for a light, a temperature control for an air conditioning unit or a blood pressure measurer for a heart monitor). If only one directory responds, then MUDO 102 may associate a command path, either local or cloud, for the resource according to which resource directory, local or cloud, respectively, responded. However, if both directories 120 and 122 respond, MUDO 102 may check which command path had the fastest response and/or best performance and may associate the faster command path with the resource. Typically, the speed and quality of response are a function of the communication channel which MUDO 102 may use in connecting to the relevant directory. Generally, when MUDO 102 may be within range of WiFi router 104, local resource directory 120 may respond faster while, when MUDO 102 may be out of range, cloud resource directory 122 may respond faster. In the first case, MUDO 102 may select the local command path while in the second case, MUDO 102 may select the cloud command path.

Once MUDO 102 has associated the command path with the particular discovered resource, MUDO 102 may utilize that cloud or local command path for future commands to the discovered resource.

Note that if cloud communication is used, cloud server 108 may act as a proxy between MUDO 102 and gateway 106. Since both cloud server 108 and gateway 106 have resource directories 122/120, respectively, the present invention may provide the same functionality regardless of the communication channel. As a result, MUDO 102 may utilize the same commands, of a set of unified commands, such as GET, UPDATE and NOTIFY, to both cloud server 108 and gateway 106 and both will respond in a similar way.

Figure 4A:
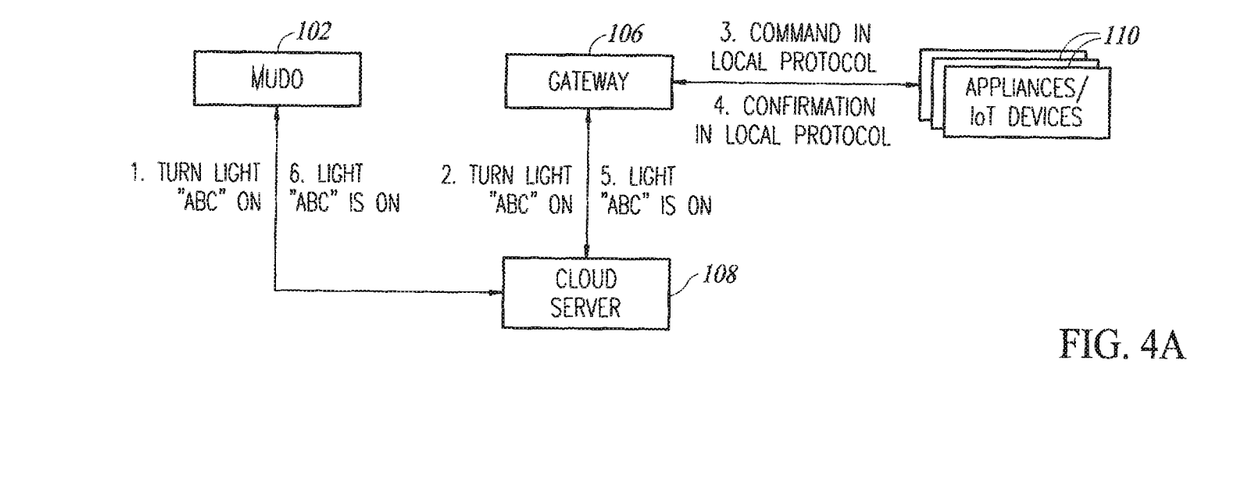
FIGS. 4A and 4B are schematic illustrations of the seamless control system of FIG. 2 during cloud and local operation, respectively.

Reference is now made to FIGS. 4A and 4B, which illustrate the operational stage for cloud and local operation, respectively. When MUDO 102 is connected to cloud server 108 (FIG. 4A), MUDO 102 may send (step 1) an instruction, such as "Turn light ABC on" to cloud server 108. Cloud server 108 may, in turn, pass (step 2) the instruction to gateway 106 which, in turn, may convert (step 3) the instruction to a command in the protocol of the selected IoT device 110. In step 4, the selected IoT device 110 may respond with a confirmation of its state to gateway 106. This confirmation is in the protocol of selected IoT device 110. Gateway 106 may then confirm (step 5) that "Light ABC is on" to cloud server 108 which, in turn, may confirm (step 6) to MUDO 102 that "Light ABC is on".

It will be appreciated that, when Internet 132 is used, cloud server 108 may operate as a proxy, exposing the common language of gateway 108 to MUDO 102.

When MUDO 102 is connected to gateway 106 (FIG. 4B) using local network 130, MUDO 102 may send (step 7) the instruction "Turn light ABC on" to gateway 106. Gateway 106 may, in turn, convert (step 8) the instruction to a command in the protocol of the selected IoT device 110. In step 9, the selected IoT device 110 may respond with a confirmation of its state to gateway 106. This confirmation is in the protocol of selected IoT device 110. Gateway 106 may then confirm (step 11) that "Light ABC is on" to MUDO 102.

Figure 4B:
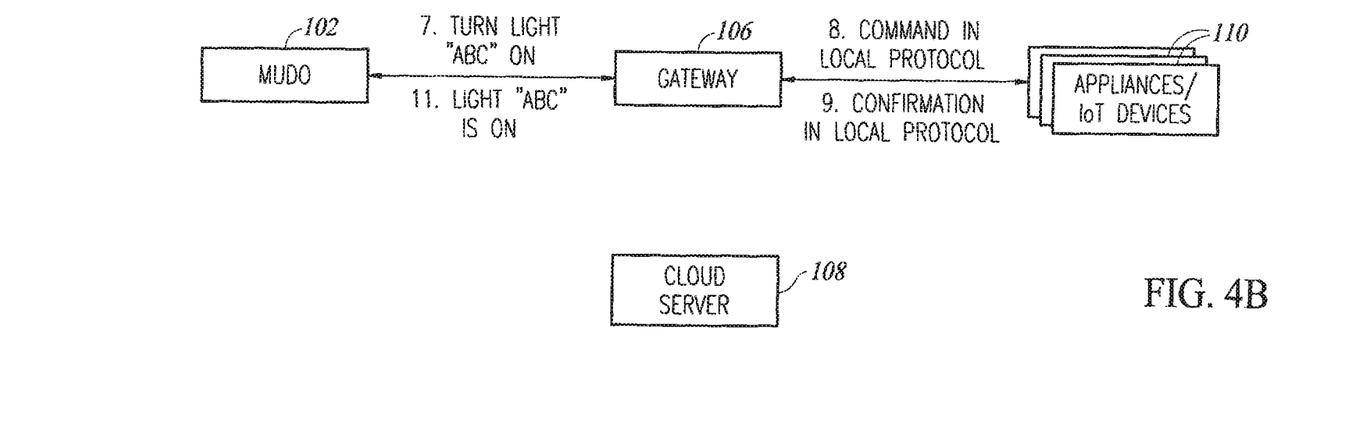

It will be appreciated that, when the local channel is used, cloud server 108 is not part of the communication and there is a direct communication between MUDO 102 and gateway 106 over the WiFi network 130.

As mentioned hereinabove, system 100 operates in the same way with local and with cloud resources. For example, there may be a gateway 108 with an ID of "f554dbef-4772-4692-896d-73aa742a382b" which may host a local resource with the URI of "/01/switch" representing the "switch" (On/Off) function of a smart light connected to gateway 108.

In this example, MUDO 102 may send discovery queries to both local and cloud resource directories 120 and 122, respectively. If the response is from the local resource directory 120, the result may be, for example, "coap://198.162.0.90:12654/01/switch", indicating that the switch is accessible via UDP at IP address 198.162.0.90, port 12654, and URI "/01/switch". However, if the response is from cloud resource directory 122, the result may be, for example, "coap+tcp://cloud.net:5357/oic/route/f554dbef-4772-4692-896d-73aa742a382b/01/switch", indicating that the switch is accessible via TCP, the IP address of cloud resource directory 122 may be determined by resolving the DNS of 'cloud.net', the relevant port is 5357 and the URI is "/oic/route/ . . . " (slash before oic), such as "/oic/route/f554dbef-4772-4692-896d-73aa742a382b/01/switch" (i.e. the switch URI is concatenated to the ID of the gateway).

In both cases, to determine the current ON/OFF state of the smart light, MUDO 102 may perform the same operation: perform a GET on the resource and then look into the response. Similarly, to turn the light ON, MUDO 102 may perform the same operation: issue an UDPATE request with a new value for the state of the light, such as {"value": ON}. From the perspective of MUDO 102, where the resource is hosted (cloud or local) is not important. Moreover, gateway 106 may respond to MUDO 102 according to the address which MUDO 102 uses when accessing the resource. This address indicates the local or cloud command path. Accordingly, gateway 106 may transmit its response via the indicated command path.

In an alternative embodiment, cloud server 108 may be capable of keeping the current state of the resources. In this embodiment, cloud server 108 may remember the last state retrieved by one of MUDOs 102 or, gateway 106 may constantly push the state updates of all the connected IoT appliances to cloud server 108. As a result, the state information may be stored in a database (which might be an in-memory data store) of cloud server 108. In this embodiment, a state request from one of MUDOs 102 to cloud server 108 may be fulfilled based on the appliance state cached in the database of cloud server 108, rather than requesting the state information from gateway 108.

It will be appreciated that, in this embodiment, only state information may be cached. Cloud server 108 may still provide commands to gateway 108.

Figure 5:
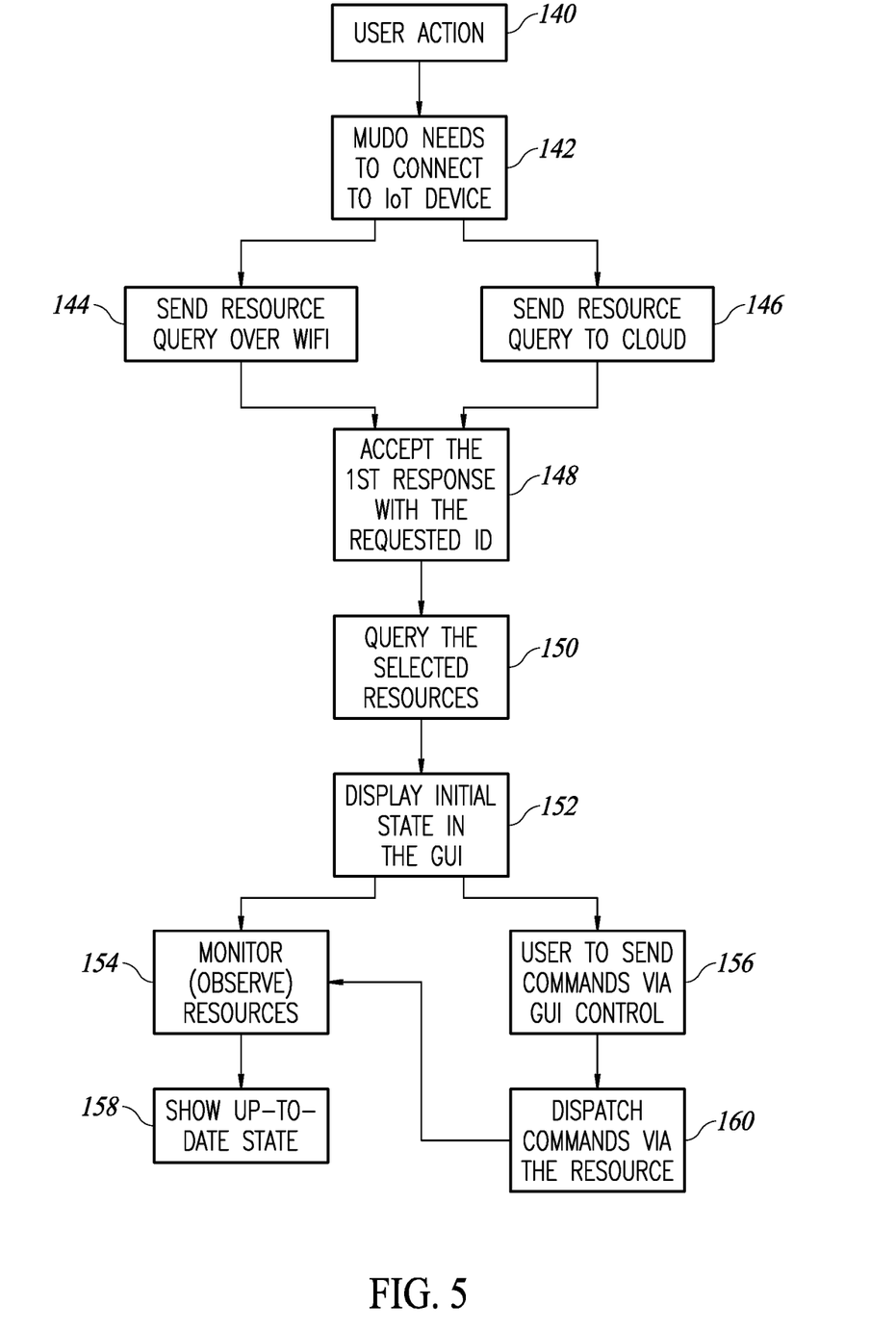
FIG. 5 is a flow chart illustration of the operations performed by the MUDO of FIG. 3 in order to implement the operations of FIGS. 4A and 4B.

Reference is now made to FIG. 5, which illustrates the operations performed by MUDO 102 in order to implement the operations of FIGS. 4A and 4B. In step 140, the user of MUDO 102 may perform an action, such as pushing a button on its user interface or providing a voice instruction or any other action, to indicate an instruction to one of IoT devices 110. This action may indicate to MUDO 102 that it needs (step 142) to discover the resource representing the needed capability of the instructed IoT device(s) 110. MUDO 102 may then set up the communication, by sending (step 144) a resource query over WiFi and sending (step 146) a resource query to the cloud or Internet. Both queries may contain a query ID.

In step 148, MUDO 102 may accept the first response (which may be either from gateway 106, or from cloud server 108) which includes the requested ID and may then query (step 150) the resources returned in the query result in order to display (step 152) the current state of those resources to the user, such as on the GUI of MUDO 102, which may include a state display section.

MUDO 102 may continue (step 154) to monitor the resources and to continually display (step 156) the current state or it may receive (step 158) instructions from the user via its GUI and may dispatch (step 160) these commands to the resource representing the capability related to the command. It will be appreciated that MUDO 102 may monitor the resource using a NOTIFY request to the resource. Upon such a state observation request, the resource may send a state update to the requesting MUDO 102 and may continue to send any state changes until the NOTIFY request may be cancelled.

It will be appreciated that, as mentioned hereinabove, the present invention may enable users to operate their IoT devices 110 from outside of their local or home WiFi and to do so with full functionality. Moreover, it will be appreciated that, when their connection to the Internet goes down, they can still operate their IoT devices 110, since their local WiFi router 104 may still be operative. Moreover, they may operate appliances and IoT devices 110 from multiple vendors since MUDO 102 can handle multiple protocols.

Figure 6:
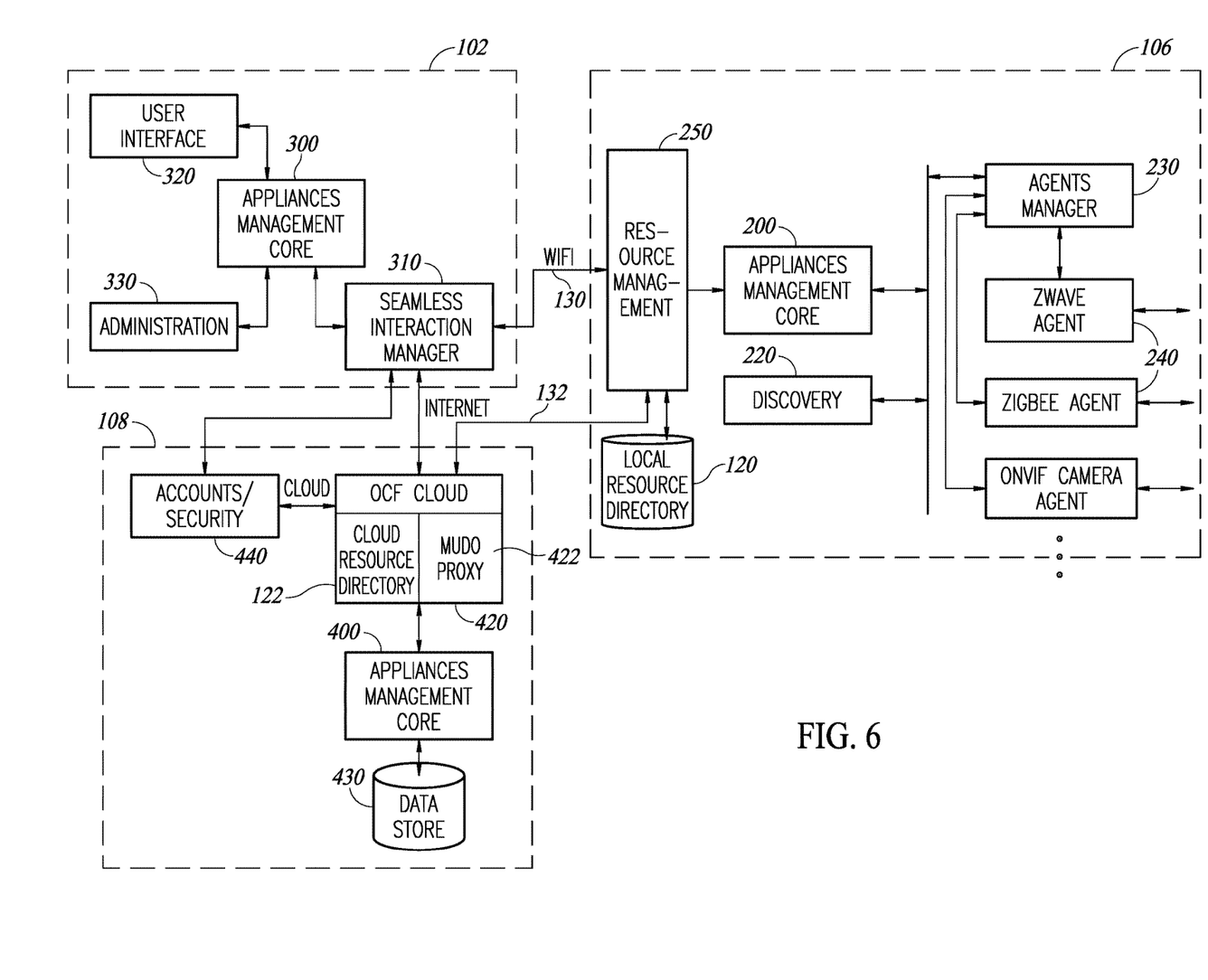
FIG. 6 is a schematic illustration of an exemplary implementation of the seamless control system of FIG. 2.

Reference is now made to FIG. 6, which illustrates an exemplary implementation of MUDO 102, gateway 106 and cloud server 108. This implementation may utilize many elements discussed in US Patent Publication 2019/0019402, published Jan. 17, 2019, issued as U.S. Pat. No. 10,867,507, commonly owned by the Applicant of the present application and incorporated herein by reference. The example provided below is implemented using the OCF (Open Connectivity Foundation) standard. It will be appreciated that this is just an example; the system may be implemented with other protocols or standards as well.

Gateway 106 may comprise an appliances management core 200, a discovery unit 220, an agent manager 230 and a plurality of per protocol agents 240. Gateway 106 may also communicate with MUDO 102 and IoT server 108 via a resource manager 250.

Appliances management core 200 may store up-to-date state information and may provide the infrastructure for managing its list of smart home or IoT devices 110 and their resources, currently connected to gateway 106, in a manner close to the resource model. The list may include the device, its associated resources, the attributes of each resource and the value of each attribute.

As described in more detail hereinbelow, resource manager 250 may control local resource directory 120 and may reflect its structure to the external world as resources. Resource manager 250 may resolve GET requests to the resources by identifying the resources and then retrieving the state information stored within appliances management core 200.

Discovery unit 220 may provide a way to recognize devices newly connected to gateway 106, so they can be added to the system in a fully functional way. This includes device detection, authentication and pairing.

Agents manager 230 may provide the infrastructure for plugging new connectivity protocols into gateway 106. Manager 230 may manage the list of agents 240, each of which may be a software plug-in implementing a specific communication protocol with the smart home devices 110. Each agent 240 may implement connectivity with devices utilizing its protocol, via a dongle providing the relevant modem. For example, there may be a ZigBee agent 240 to implement connectivity with devices utilizing the ZigBee protocol. Other agents 240 may include an OnVif Camera Agent for controlling cameras, an NB-IoT (Narrowband IoT) radio agent, a LoRa agent, a DMX agent for lighting control and a FIHR agent for medical devices.

MUDO 102 may comprise an appliances management core 300, a seamless interaction manager 310, a user interface 320, and an administration unit 330. Appliances management core 300 may provide the infrastructure for managing the list of the smart home devices and home care devices connected to MUDO 102. The list may include the connectivity status of each device, its state and its supported commands for interaction. Core 300 may provide the infrastructure for the other modules of MUDO 102.

Seamless interaction manager 310 may provide communication with gateway 106 and cloud server 108, typically via the OCF protocol. User interface 320 may provide information on the current state of the connected smart home devices, home care devices and cameras and may enable commands-based interaction with devices 110. Administration unit 330 may support administration tasks for authorized users, since each MUDO 102 may be used by multiple users and may operate in multiple premises (home, office, friend's house, clinic, etc.).

Cloud server 108 may comprise an appliances management core 400, a cloud module 420, a data store 430 and an accounts/security unit 440.

Appliances management core 400 may manage the list of appliances/devices defined in an account (per home or premises), their properties, state and connectivity. It will be appreciated that gateway 106, server 108 and MUDO 102 comprise appliance management cores 200, 300 and 400, respectively. However, core 200 of gateway 106 lists IoT devices of the premises, while core 300 of MUDO 102 lists IoT devices of the possibly multiple premises (home, office, friend's homes, clinics, etc.) where MUDO 102 can operate and core 400 of server 108 lists IoT devices of the multiplicity of MUDOs 102 and gateways 106 that communicate with it.

Cloud module 420 may comprise cloud resource directory 122 and a MUDO proxy 422. Cloud module 420 may be based on the IoTivity cloud module and may enable the exposure of the smart home devices to "the cloud" or data network 132. Subject to owner's authorization, the module may communicate with gateway 106 to provide information on the state of devices 110 and may control the devices remotely. MUDO 102 may interact with devices 110 over Internet 132 in a manner similar to the interaction within the home WiFi 130. Data store 430 may maintain any persistent data, such as account data and device data, in a secure and reliable way. Accounts/security unit 440 may manage the database of users, may provide the infrastructure for login, authentication and session management, may keep users' permissions and may provide authentication services for cloud module 420.

It will be appreciated that when MUDO 102 may communicate locally with gateway 106, MUDO 102 may not require an account since communication may be allowed to everyone who has access to the local network. However, cloud server 108 may serve multiple MUDOs 102 from multiple premises and thus, cloud server 108 may support accounts via accounts/security unit 440. Unit 440 may ensure that MUDOs 102 may only communicate with their associated gateway 106. In order for each MUDO 102 to communicate via cloud server 108, accounts unit 440 may ensure that MUDO 102 may be logged into its associated account and that its associated gateway 106 may be logged into its account. Typically, a user may log gateway 106 in either via a gateway GUI (not shown) or a MUDO 102 may associate its gateway 106 with its account, typically during "unboxing" or installation of gateway 106.

Accounts/security unit 440 may check each request from each gateway 106 and MUDO 102 and may utilize a pre-authenticated TCP connection in order to determine the account associated with the requesting gateway or MUDO. To pre-authenticate the TCP connection, a gateway or MUDO may initially send a secure authentication request, with its credentials (such as, username and password, or token) representing a valid account. If unit 440 may determine that the credentials are valid, that very connection may become authenticated and associated with the specific account. Cloud server 108 may store this information and may associate a 4-tuple identifying the TCP connection with the account. Cloud server 108 may then treat each request (for example, resource discovery query) sent by a client (MUDO or gateway) via an authenticated connection as being from the account owner. It will be appreciated that, with pre-authenticated TCP connections, there may be no need to send the authentication data with every request.

In accordance with a preferred embodiment of the present invention, resource manager 250 on gateway 106 may be responsible for exposing resources (local and cloud), and for providing the interaction with those resources. Resources may be exposed only for appliances/IoT devices 110 connected to gateway 106.

Resource manager 250 may respond to notifications provided by its appliance management core 200, as received from agents 240. Specifically, when an appliance or device 110 may change to connected from disconnected, resource manager 250 may register the change for all of the appliance's resources in its local resource directory 120. Moreover, when the status changes in the opposite direction, to disconnected, resource manager 250 may unregister all the resources of the appliance or device 110. Furthermore, if some capabilities of an appliance are added or removed dynamically, resource manager 250 may re-register the resources.

Accordingly, as long as the appliance is connected, its capabilities/resources are exposed via resource directories 120 and 122, while when the appliance is disconnected, it won't interact since its resources aren't exposed.

When registering a new resource, resource manager 250 may calculate a unique device ID per appliance. Resource manager 250 may register and unregister resources, and may link the resource with the ID of the represented IoT appliance 110, so requests to any resource, via GET, UPDATE, or NOTIFY, may be delivered to the appropriate agent handling the appliance, and from there, via the agent protocol, the request may reach the physical appliance.

Agents 240 may update appliance management core 200 about the state of each attribute of each resource, and appliance management core 200 may maintain a "hashmap" of the attribute name and attribute value. When the resource is queried, core 200 may convert the hashmap into a response structure, such as an OCF-compliant response structure.

Resource manager 250 may receive GET requests from the MUDO 102 of the resources and, since appliance management core 200 may store the most up-to-date information on each appliance, resource manager 250 may handle the GET request based on the information retrieved from appliance management core 200. There may be no need to access the agent to query the IoT device 110.

Resource manager 250 may receive an UPDATE request from MUDO 102 to the resources. Each such command request may take care of setting a single attribute value. The UPDATE request process may involve creating a command to the relevant agent, based on the requested resource, attribute and the desired value, providing the command to agent manager 230 to provide to the relevant agent 240, waiting for the command execution, retrieving the attribute values after the command execution, converting the attribute values into the OCF-compliant response structure, and sending a response to MUDO 102.

It will be appreciated that agents 240 may report an update to appliance management core 200 to issue a message that an attribute has been changed for a resource of a particular IoT device 110. Such an update may be caught by resource manager 250 which may convert the attribute values into the OCF-compliant notification structure and may dispatch a notification via the relevant resource to all MUDOs 102 which may be observing that particular IoT device 110. Typically, all the resources managed by resource manager 250 are observable and MUDOs 102 may typically register as an observer upon connecting, and de-register upon disconnecting.

As discussed hereinabove, both gateway 106 and MUDO 102 may maintain a permanent connection with cloud server 108, may authenticate it and may re-establish the connection to cloud server 108 when the connection goes down.

In accordance with a preferred embodiment of the present invention, gateway 106 may synchronize between local resource directory 120 and cloud resource directory 122. To this end, a new resource, which resource manager 250 may first register in its local resource directory 120, may be registered with cloud resource directory 122 shortly thereafter. Similarly, if a resource is unregistered locally, resource manager 250 may unregister it from cloud resource directory 122 shortly thereafter. Since the registration and unregistration may be driven by agents 240, it may be an asynchronous operation and thus, can happen when the cloud connection may not be available. Thus, if a cloud registration fails, resource manager 250 may mark the resource as "pending". Once a successful cloud sign-in is performed, resource manager 250 may be notified, at which point, it may re-register all the pending resources with cloud resource directory 122. Alternatively, cloud server 108 may, upon detecting that gateway 106 was disconnected and is trying to reconnect, clean up all the resources related to a specific gateway 106, at which point, gateway 106 will be required to re-register all the active local resource with cloud server 108 upon reconnection.

As discussed hereinabove, each MUDO 102 may interact with cloud resources in the same way they interact with local resources. In other words, each MUDO 102 may interact with cloud server 108 to operate IoT devices 110 by transmitting the relevant GET, UPDATE and NOTIFY requests, as well as receiving notifications. MUDO proxy 422 may proxy these requests to and from resource manager 250 of gateway 106.

It will be appreciated that gateway 106 may act in the same way, regardless of whether the query/command came from the Internet 132 or from the local network 130. Similarly, MUDOs 102 may manipulate the "client representation" of the resources, regardless of whether the actual resources are hosted in the cloud (and proxied) or on the local network.

It will be appreciated that there are a few implementation differences: 1) Cloud server 108 may support only a TCP connection while gateway 106 may support both UDP and TCP connections. 2) Access to cloud server 108 requires a successful cloud account authentication. 3) In order to identify if the resources are cloud-hosted or local, the URIs of cloud-hosted resources may have a prefix, such as "/oic/route/", before the local resource URI, followed by the unique identifier (device ID) of the relevant gateway 106. For example, for a gateway 106 having the "device ID" 86bea2ec-561d-41f9-b4cb-5f8e09529a24, a local resource /mainSwitch will be represented to its MUDO 102 as /oic/route/86bea2ec-561d-41f9-b4cb-5f8e09529a24/mainSwitch when discovered from the cloud. 4) OCF cloud module 420 may report all the resources belonging to an account used by a MUDO 102 together, in a single response, while each resource manager 250 may send its own responses independently over its local network 130.

When a MUDO 102 (usually driven by certain user action) needs to establish the connectivity with appliance(s)/IoT device(s) 110, appliance management core 300 of MUDO 102 may initially "discover" the resources matching the unique ID of the requested appliance 110. Once the matching resources are located, the MUDO 102 may perform a GET request on all the resources, may capture the result as the "current state", and may capture the attributes of the resources based on the response. Upon a successful GET query performed on all the resources, appliance management core 300 may register as an observer for each resource and may report a successful connection, together with the data, to appliance management core 200 of gateway 106. A failure at any stage may be reported as "Disconnect".

To perform the resource discovery, seamless interaction manager 310 of MUDO 102 may issue two requests in parallel, one over local WiFi 130 and one over the Internet 132. The latter may be transmitted using the TCP connection to cloud server 108, which may have been established before the request was made. The local request may be based on a UDP multicast while the cloud request may be directly to the authenticated cloud TCP endpoint. It will be appreciated that MUDO 102 may not send the local request when there is no active WiFi connectivity and may not send the cloud TCP request when there is no cloud connectivity, or when there is an authentication issue.

Seamless interaction manager 310 may wait for the response(s) containing the resources with the unique ID of the searched device and may utilize "simple" prioritization for this. Accordingly, each MUDO 102 may accept the first response that has the unique ID of the device (whether it comes from the WiFi or from the cloud) and may drop all the further matching responses. Once the response is received and selected for further work, seamless interaction manager 310 may then transmit GET queries on the resources arriving with the first response.

It will be appreciated that, in some cases, "take the first responder" may not be ideal, since there may be a prior knowledge about a certain channel being optimal. For example, in some networks, overall performance of the WiFi is much better than that of the cloud, so there is an advantage to choose the WiFi channel, even though the initial response from the "cloud" may have been faster.

In an alternative embodiment, seamless interaction manager 310 may utilize a "delay based" prioritization. In this embodiment, after getting the first response from a non-preferred channel, seamless interaction manager 310 may wait a predefined amount of time (say, 300 msec) for a response. If a response from the preferred channel appears within that time frame, the preferred channel may be used, and the initial response may be dropped; if not, seamless interaction manager 310 may continue with the initial response, and may ignore any further responses from the preferred channel.

In a further alternative embodiment, seamless interaction manager 310 may utilize a "continued race" type of prioritization. After getting the response from one of the channels, seamless interaction manager 310 may begin transmitting GET queries about the resources, but, in this embodiment, to all of the channels. The channel that responds faster to the GET requests may become the active channel and seamless interaction manager 310 may drop the slower channel.

MUDO 102 may keep a cache of the resources used in the last successful connection. In this case, MUDO 102 may utilize the cached resources, before performing resource discovery of any kind If the cached information is incorrect, any GET request using that information will fail, so MUDO may activate a fallback operation and may perform discovery at this point. Cached resources may be invalidated (i.e. removed from cache) upon a non-successful usage attempt, or a network change detected by MUDO 102.

It will further be appreciated that, when, in addition to mirroring resources in cloud resource directory 122, the states of resources are also cached in cloud server 108, system 100 may more easily integrate with third party voice assistants, such as Google Home, Alexa, Baidu, etc. These voice assistants typically use proprietary cloud-to-cloud integration interfaces but, when they have access to the states of resources as well as to the states themselves, they may operate with system 100. For this, gateway 106 may also include agents 240 designed to run the particular protocols of the voice assistants.

Applicant has realized that system 100 may be improved to provide access to the video output of a smart camera from both within the local network 130 and outside of it, via the Internet 132. This would enable consumers to access their home cameras from everywhere, using the same MUDO 102 that they use for their other IoT devices 110.

Within the local network 130, this is straightforward, as MUDO 102 may access the camera via gateway 106 or even directly. This may provide a point-to-point connection. However, in the prior art, the point-to-point connection which is established when the user is outside of the local network cannot be maintained when either the Internet goes down or the user moves inside and switches to the WiFi network. It will be appreciated that an alternative is to route the traffic via cloud servers. However, video traffic is huge compared to typical data and voice traffic, and thus, is undesirable. Moreover, the performance of point-to-point connections are generally better.

In the prior art, most premises have firewalls to block access to their local network. However, there are protocols to do "NAT punching", to fool a firewall to grant such an access. To perform the punching, the Internet server with which the camera operates is used to exchange set-up data, via a protocol called the "signaling protocol", such as the signaling protocol forming part of the WebRTC protocol (This signaling is explained in the article found at: https://www.html5rocks.com/en/tutorials/webrtc/infrastructure/). The signaling protocol between the camera and the 'client' (the device trying to access the camera), helps to establish the point-to-point connection between them, and, if it fails, the Internet server implements a "tunnel via cloud" fallback operation.

In accordance with a preferred embodiment of the present invention, gateway 106 may be used as a middleman between the camera and MUDO 102, even when the camera and MUDO 102 may be connected via WiFi and not via the Internet. As described in more detail hereinbelow, gateway 106 may connect to the video stream natively exposed by the camera (for example, using the RTSP protocol, or any other similar protocol), and to transcode that stream into a different video format/protocol exposed by gateway 106.

Figure 7:
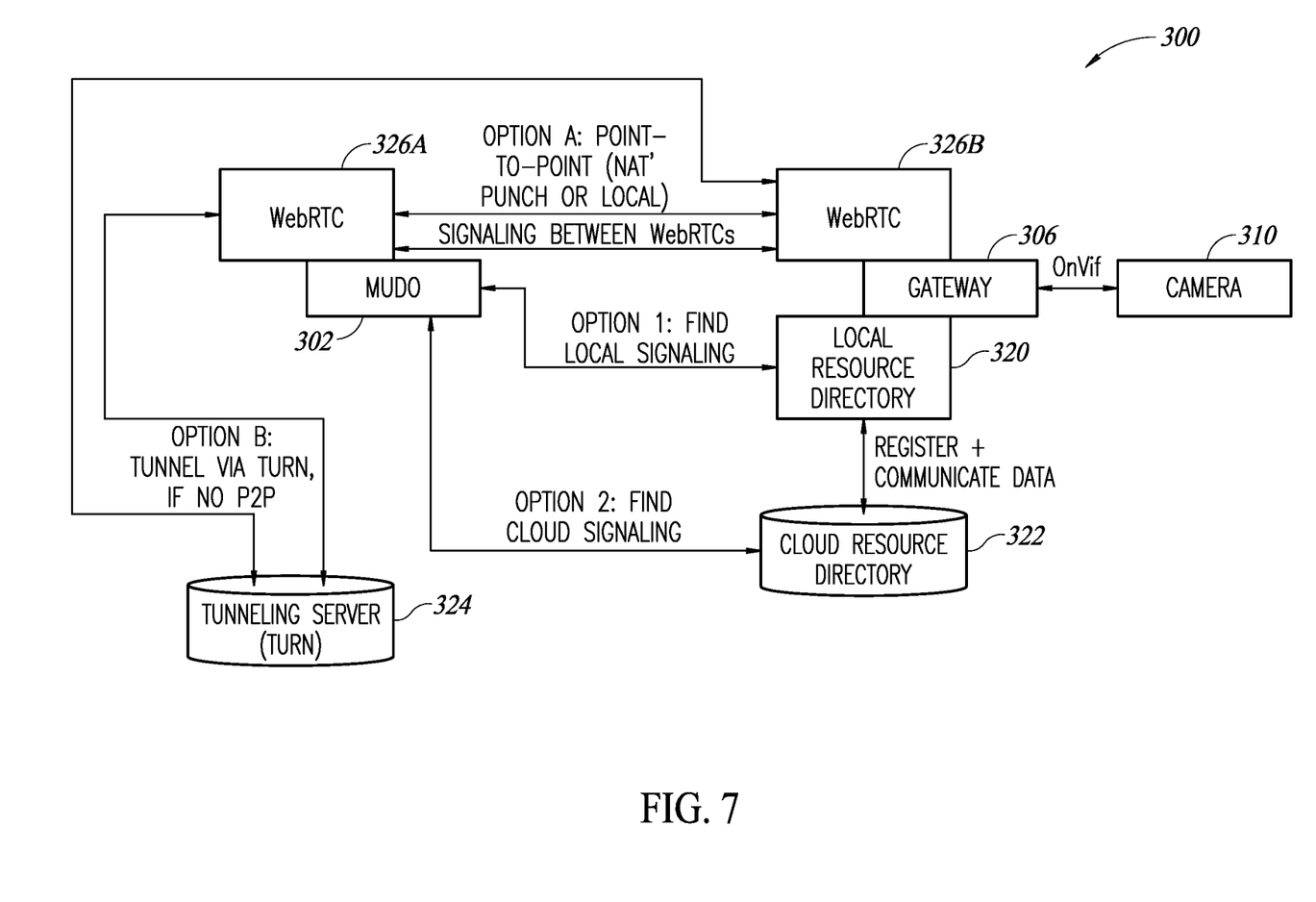
FIG. 7 is a schematic illustration of an alternative embodiment of the seamless control system of the present invention, constructive and operative in accordance with a preferred embodiment of the present invention for IoT cameras.

Reference is now made to FIG. 7, which illustrates such a system 300 for operating IoT cameras 310. Like in the previous embodiments, system 300 comprises a MUDO 302, a gateway 306, a cloud server 308, a local resource directory 320 and a cloud resource directory 322. However, in this embodiment, system 300 may additionally comprise a camera 310, a tunneling server (TURN) 324 and two WebRTC video establishing clients 326A and 326B forming part of MUDO 302 and gateway 306, respectively.

Camera 310 may be an appliance exposed by gateway 306, similar to the appliances and IoT devices 110 of the previous embodiments. It may typically implement an IoT camera protocol, such as the OnVif protocol, and gateway 306 may comprise an agent 240 to communicate with camera 310.

In particular, OnVif agent 240 within gateway 306 may provide discovery of any cameras 310, authentication of users and/or MUDOs 302 that attempt to access camera 310, pan-tilt-zoom (PTZ) control, as well as providing the video stream from camera 310. OnVif agent 240 may provide the video stream via an "RTSP" request, which provides gateway 106 with the URL of the stream, typically at rtsp:// .... Gateway 106 may then convert the RTSP stream format into a different video format/protocol.

While OnVif agent 240 may be responsible for the primary connectivity to camera 310, WebRTC agents 326A and 326B may be responsible for providing the video stream between MUDO 302 and gateway 306. Once the primary OnVif agent 240 may establish connectivity with gateway 306, WebRTC clients 326A and 326B may operate to provide the video stream, as well as additional information, such as state and attributes of camera 310, to MUDO 302, typically via the resource model described hereinabove.

For example, during discovery, OnVif agent 240 may provide a list of all the resources of camera 310, which resource manager 250 may register as OCF resources. As a result, MUDO 302 may access the resources of camera 310 via WebRTC clients 326A and 326B, which may operate an OCF channel. In accordance with a preferred embodiment, gateway WebRTC client 326B may expose a dedicated resource to support signaling related communication with MUDO 302. Such a resource may be defined per each camera 310. Therefore, interaction with a specific resource is always linked to a specific camera 310 managed by the gateway 306.

The establishing resource may become available once gateway WebRTC agent 326B may confirm the connectivity. It may be registered with the cloud server 308, so MUDO 302 can detect the resource and may communicate with it, either locally (on network 130) or via the Internet 132. Accordingly, MUDO 302 may keep the same communication flow, whether it is co-located with gateway 306 on the same WiFi network 130, or not. In the first case (co-location), the signaling exchange may be performed by WebRTC clients 326A and 326B over the WiFi network 130, and the video communication session will also be established over the WiFi network 130. Therefore, the video stream can be shown to the co-located MUDO 302, even when connectivity with the Internet is down.

The signaling implementation may support multiple MUDO 302s so that multiple MUDOs 302 may display the same video stream (from the same camera), without interrupting each other. In order to support multiple MUDO 302s, WebRTC agent 326B of gateway 306 may wrap the data being transferred to each MUDO 302 with a "JSON" containing the unique session ID associated with each MUDO 302. A session ID may be generated by each WebRTC client 326A of each MUDO 302 during its signaling process to access a specific camera 310. Accordingly, information coming to multiple MUDO 302s is kept separate.

The establishing resource may consist of three attributes, "offer_sdp", "answer_sdp" and "candidate". The typical signaling process is as follows: MUDO 302 may initiate the communication by creating a unique session ID. MUDO 302 may then generate an "offer" (such as "Set remote SDP (session description protocol)"), and may send the offer to gateway 306 as an UPDATE request with the "offer_sdp" attribute to the establishing resource. Gateway 306 may process the received offer, may generate an "answer", and may send the answer data as a notification value of "answer_sdp" to the resource.

MUDO 302s may then observe the resource, processing answer_sdp answers, and, when receiving an answer with their session ID, may process their answer and may set a remote SDP. MUDO 302 may then generate a local "candidate" and may send it to gateway 306, via an UPDATE request with the candidate attribute value.

Gateway 306 may receive the candidate, may perform "Set remote candidate", and may then generate its own local candidate which it then sends to all the observing MUDO 302s via a NOTIFY request with the "candidate" attribute value.

A MUDO 302 may observe the resource for notifications of values of "candidate", and once the relevant SessionID is sent, may process the candidate being sent in order to "Set remote candidate". With this, signaling is finished.

Once the exchange between the parties is successful, the video connection is established. Ideally, the video connection will be a P2P (point-to-point) connection, which may typically be the case when MUDO 102 is connected to the local network. When MUDO 102 is connected to the Internet, the video connection will be a P2P connection if it is possible to do so within the restrictions of the network (routers and firewalls configuration). Otherwise, gateway 306 may request that TURN server 324 establish the connection via a WebRTC type "tunnel". Typically, TURN server may be a third-party product supporting the TURN standard. Typically, the video signal may be provided between WebRTC agents 326 while control signals may be provided between MUDO 302 and resource directories 320 and 322. Both video and control signals may be provided between camera 310 and gateway 306.

The mechanism which MUDO 302 uses to choose between the cloud-hosted and the WiFi-hosted establishing resource (listed in cloud resource directory 322 or local resource directory 320, respectively) is identical to that described hereinabove for other appliances. Therefore, there is a possibility to establish the communication within the WiFi network or via the cloud. When two routes are possible, the same considerations described hereinabove are applied.

Once MUDO 302 may select a route, there may be no difference in the data exchange flow, nor in the data itself, between the WiFi (UDP) and cloud (TCP) options. The same protocol and the same data are exchanged even though they use different transport mechanisms along different command paths. It will be appreciated that, in some embodiments, the video establishing client may successfully operate a P2P video path, which was set up via the cloud command path, rather than via the local command path.

Figure 8:
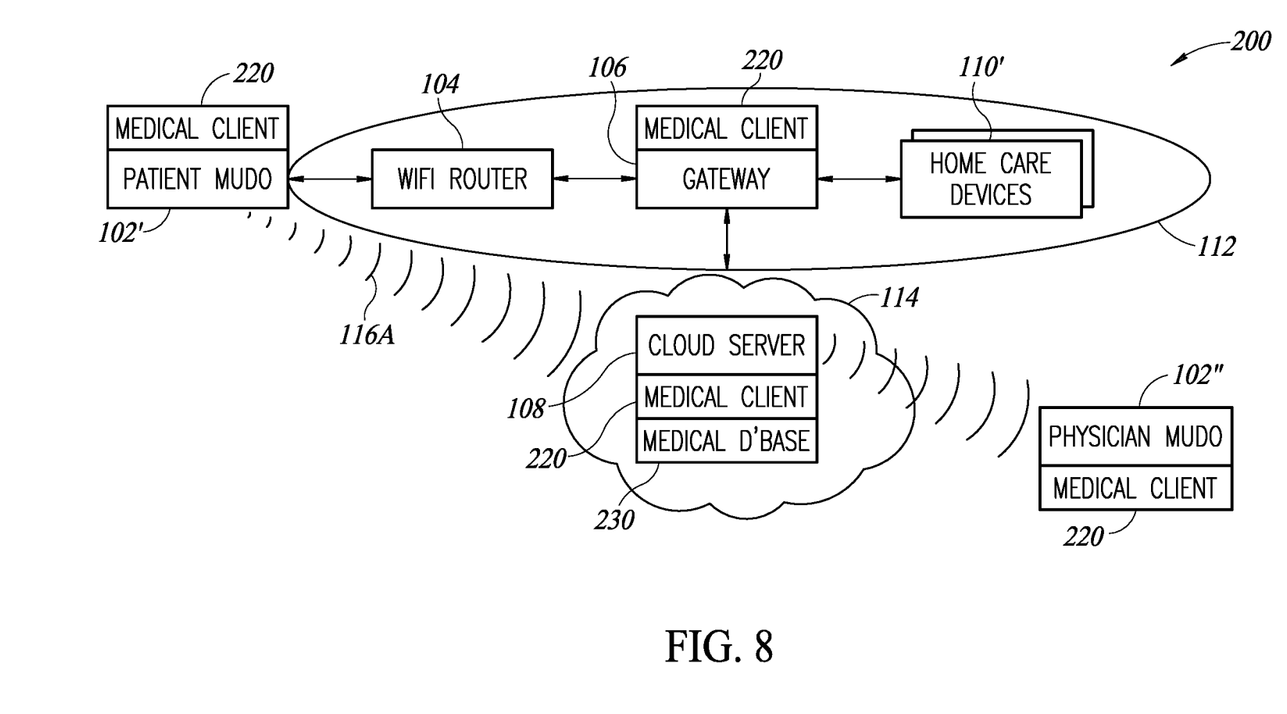
FIG. 8 is a schematic illustration of a home care system using the system described hereinabove for home care devices, constructive and operative in accordance with a preferred embodiment of the present invention.

Reference is now made to FIG. 8, which illustrates a home care system 200 using the system described hereinabove for home care devices, here labeled 110'. Home care system 200 may comprise a patient MUDO, here labeled 102', WiFi router 104, gateway 106, cloud server 108 and home care devices 110' and may operate as described hereinabove. In addition, home care system 200 may additionally comprise a physician MUDO 102".

Patient MUDO 102' may be any suitable home care device and may be utilized by a sick or a healthy user. Patient MUDO 102' may operate as described hereinabove and may enable a user to operate his/her home care device, both activating it and receiving its measurement data. For example, the user may instruct MUDO 102' to activate a blood pressure cuff and to display the results on the display of MUDO 102'. The activation may be performed using an UPDATE request and the results may be received in response to a NOTIFY request. Both patient MUDO 102' and physician MUDO 102" may receive the results.

For this implementation, the home care device may have at least one resource representing the measurement request, and the measurement may be of any medical or well-being related state of a person or human being.

In accordance with a preferred embodiment of the present invention, the measurements may be delivered to cloud server 108, associated with a UserID and a timestamp. This may be done in one of two ways, either by gateway 106 pushing the measurements, once obtained, to a measurement history database 230 in cloud server 108 or by cloud server 108 performing an ongoing OBSERVE request on the measurement resource and storing the observed data in database 230, with the timestamp and UserID.

Measurement history database 230 may typically store the following for each measurement: UserID, timestamp, deviceID, measurement (for devices with multiple measurements in one device), and value. It will be appreciated that, for accessing home care devices 110' that involve measuring data about a user, patient MUDO 102' may be connected to local network 130. However, there may be home care devices that may be accessed externally, particularly for monitoring the sick or the elderly from outside of their homes. Such devices may be cameras, fall sensors, etc. In this embodiment, patient MUDO 102' may be handled by a family member or caregiver and may be used both within the premises and external to it. To maintain privacy of the patient, resource manager 250 of gateway 106 may comprise filters which may include privacy filters in order not to expose some extra-sensitive devices to the cloud (for example, by a list of devices types being extra sensitive). Such extra-sensitive devices may be defined to only be accessed locally.

Similarly, physician MUDO 102" may be operated by any kind of medical personnel, such as a physician, therapist, nurse, etc. It will generally be operated external to the premises though, if a home visit is warranted, it will be appreciated that physician MUDO 102" may be capable of connecting to local network 130 as well. It will be appreciated that this provides caregivers and medical personnel with tremendous flexibility—they can operate the home care machines and access their data wherever they are and without concern if one network or the other isn't working.

Moreover, physician MUDO 102" may typically view the history of the values by accessing an API exposed by cloud server 108. The API may enable care personnel to access the data, via or external to MUDO 102".

It will be appreciated that many home care medical devices 110' may currently communicate via the Bluetooth or BLE standard and therefore, gateway 106 may comprise a Bluetooth agent 240 with which to communicate with medical devices 110'. It will further be appreciated that HL7 FHIR is currently the international standard for sharing health information and therefore, gateway 106, cloud server 108 and MUDOs 102' and 102" may comprise a medical client 220, typically implementing the FHIR protocol, with which to transmit medical data.

It will further be appreciated that system 200 may implement the OCF standard, which provides data security as part of the standard and therefore, is ideal for maintaining the level of security which is required for medical data.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A mobile universal device operator (MUDO) to operate at least one camera in a premises, the MUDO comprising:

a video establishing client to operate a video establishing resource to establish a video stream communication with each said at least one camera;

a seamless interaction manager to transmit a gateway resource discovery request to a gateway over a local network to which said MUDO is connected and a cloud resource discovery request to a cloud server over an external network, said gateway storing a local resource directory listing at least one resource of each said camera, and said cloud server storing a cloud resource directory associated with said local resource directory, said seamless interaction manager to receive responses from said local and cloud resource directories, respectively, to select a local command path via said gateway or a cloud command path via said cloud server for activating said video establishing client depending on said responses and to associate said selected command path with each said discovered resource, said video establishing client to select between a point-to-point (P2P) video path along said local network and a tunneling server video path via said external network; and an appliance management core to transfer instructions received from a user about a selected discovered resource to said seamless interaction manager, said seamless interaction manager to translate said instructions into one of a set of unified commands to said selected discovered resource and to send said one unified command to said selected discovered resource via its associated command path.

2. The MUDO according to claim 1 and wherein said local command path includes a local resource address reached via said local network and said cloud command path includes a cloud resource address reached via said cloud network.

3. The MUDO according to claim 1 and also comprising at least a display, wherein, when said unified command is a state observation request for said at least one camera, said appliance management core to receive ongoing updates of device state from said gateway via said selected command path for each discovered resource of said camera, said core to provide said updates to said display.

4. The MUDO according to claim 1, said video establishing client to operate a P2P video path over said local network, said video path being set up via said cloud command path.

5. A gateway to enable a MUDO to operate at least one camera in a premises, the gateway to communicate with the at least one camera via a local network, each at least one camera having at least one resource, the gateway comprising:

a video establishing client to operate a video establishing resource to establish a video stream communication with each said at least one camera;

a local resource directory listing at least one resource of each said camera; and a resource manager to do the following:
respond to a resource discovery request from said MUDO via a local network with an associated local command path for said video establishing resource,
respond to commands from said MUDO for said video establishing resource using either said local command path or a cloud command path provided by a cloud server in communication with said gateway via an external network, and
synchronize a cloud resource directory on said cloud server to said local resource directory;
said video establishing client to select between a point-to-point (P2P) video path along said local network and a tunneling server video path via said external network.

6. The gateway according to claim 5, said video establishing client to operate a P2P video path over said local network, said video path being set up via said cloud command path.

7. A method for a MUDO to operate at least one camera in a premises, the method comprising:
operating a video establishing resource to establish a video stream communication with said camera;
transmitting a gateway resource discovery request to a gateway over a local network to which said MUDO is connected and a cloud resource discovery request to a cloud server over an external network;
said gateway storing a local resource directory listing at least one resource of each said camera;
said cloud server storing a cloud resource directory associated with said local resource directory;
receiving responses from said local and cloud resource directories, respectively, to select a local command path via said gateway or a cloud command path via said cloud server for activating said video establishing resource depending on said responses;
associating said selected command path with each said discovered resource;
selecting operating said video establishing resource between a P2P video path along said local network and a tunneling server video path via said external network;
receiving instructions from a user about a selected discovered resource;
translating said instructions into one of a set of unified commands to said selected discovered resource; and
sending said one unified command to said selected discovered resource via its associated command path.

8. The method according to claim 7 and wherein said local command path includes a local resource address reached via said local network and said cloud command path includes a cloud resource address reached via said cloud network.

9. The method according to claim 7 and also comprising when said unified command is a state observation request for said at least one camera, receiving ongoing updates of device state from said gateway via said selected command path for each discovered resource of said camera, and providing said updates to a display of said MUDO.

10. The method according to claim 7 and comprising operating a P2P video path over said local network, said video path being set up via said cloud command path.

* * * * *